Mar. 27, 1923.
N. POWER
STAND FOR MOVING PICTURE MACHINES
Original Filed Dec. 17, 1915   3 sheets-sheet 3
1,449,870
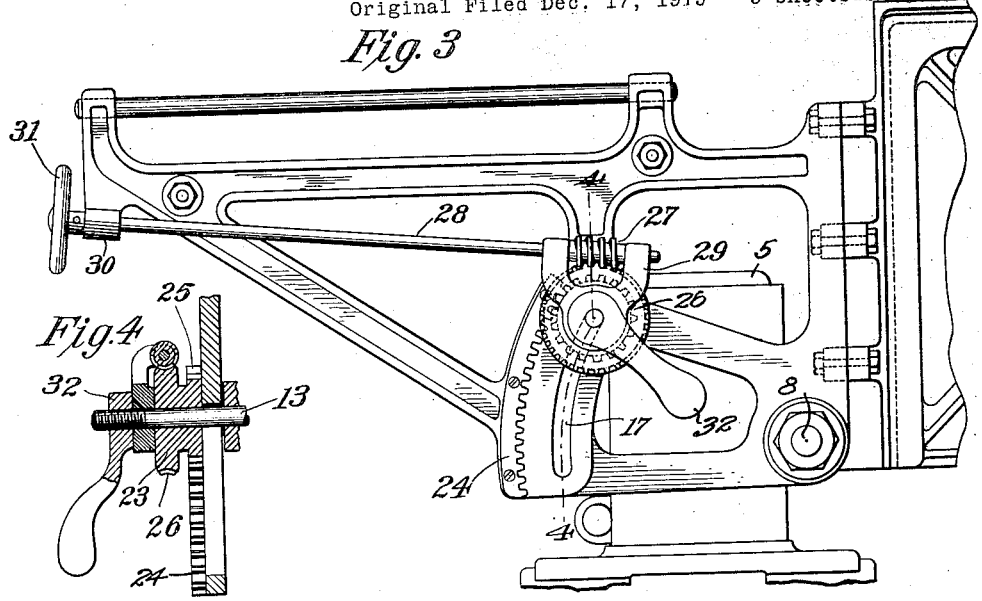
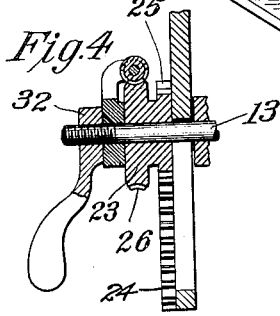
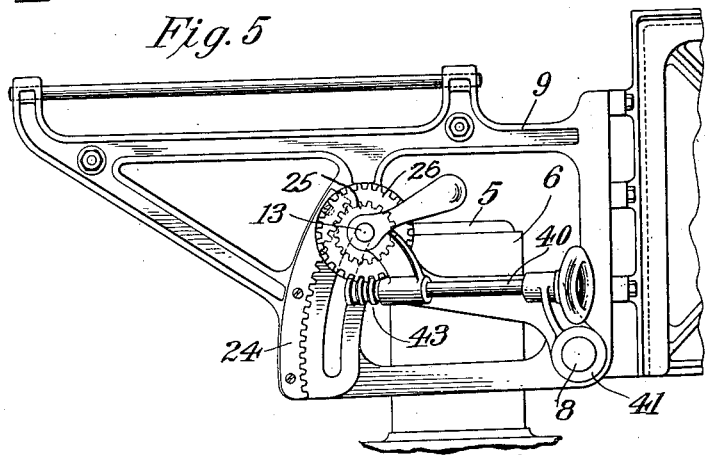
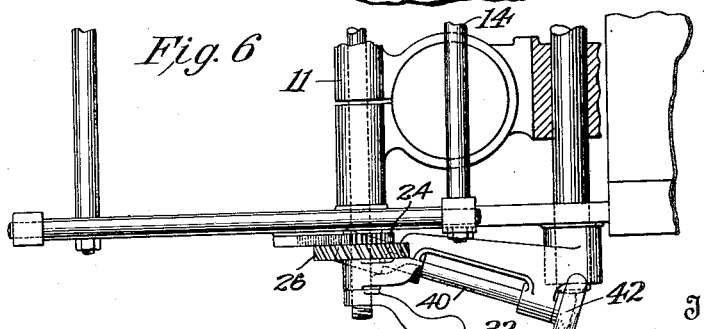
Inventor
Nicholas Power
By his Attorney
W. B. Morton Patented Mar. 27, 1923.

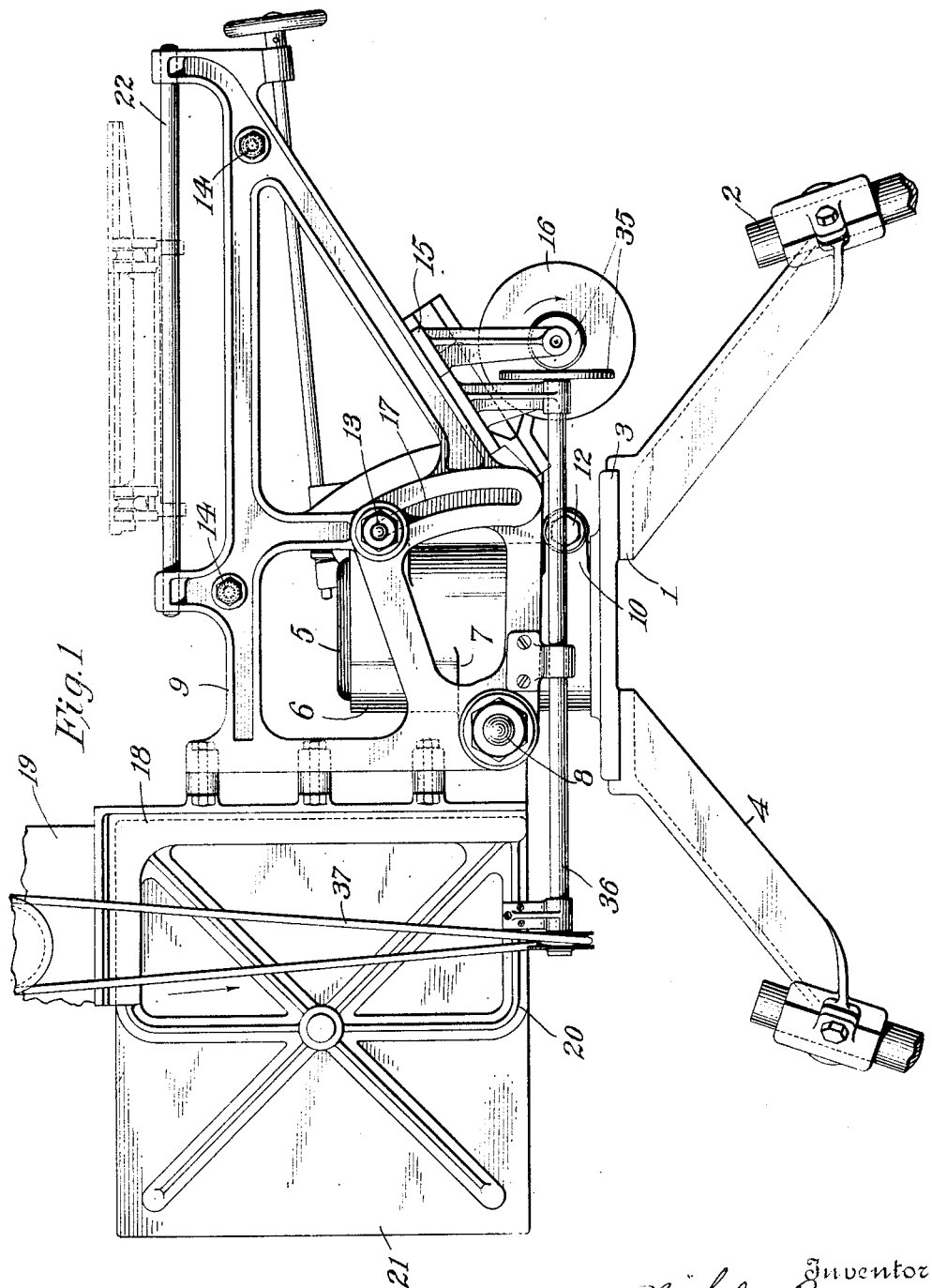

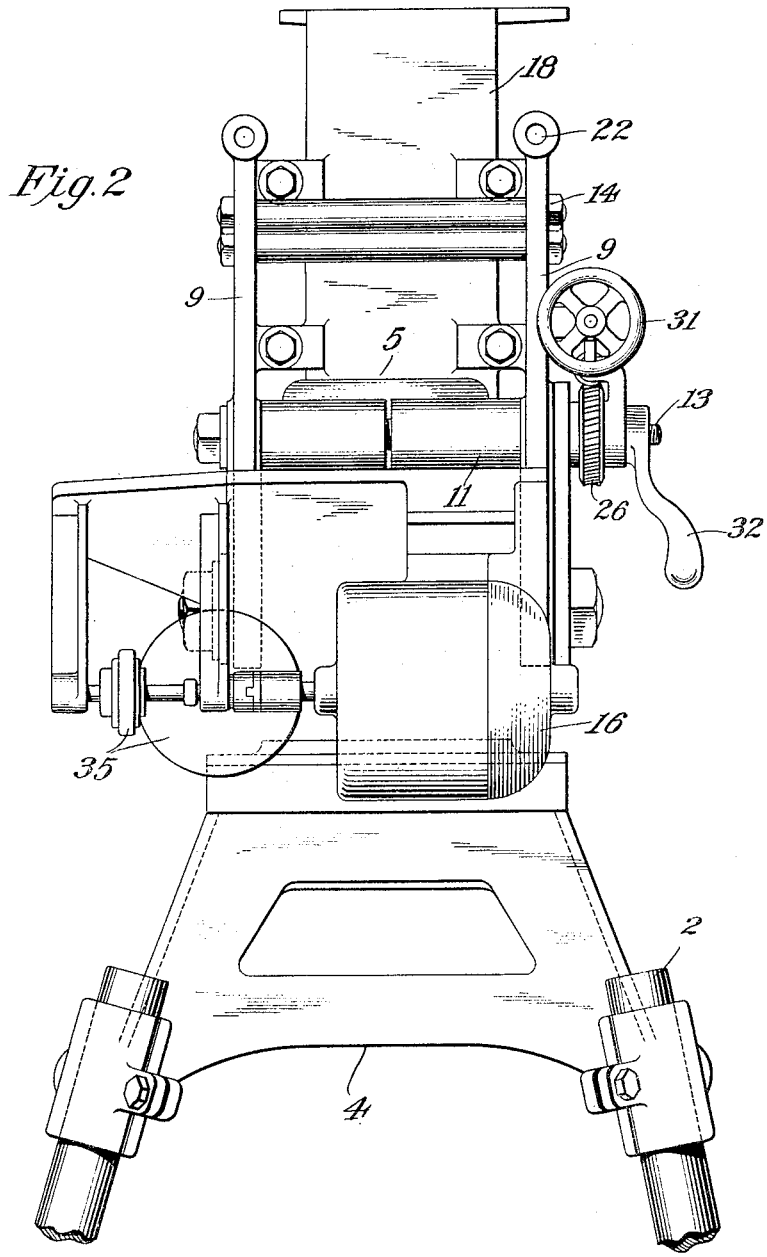

1,449,870

UNITED STATES PATENT OFFICE.

NICHOLAS POWER, OF BROOKLYN, NEW YORK, ASSIGNOR TO NICHOLAS POWER COMPANY, OF NEW YORK, N. Y., A CORPORATION OF DELAWARE.

STAND FOR MOVING-PICTURE MACHINES.

Application filed December 17, 1915, Serial No. 67,401. Renewed June 7, 1922. Serial No. 566,545.

*To all whom it may concern:*

Be it known that I, NICHOLAS POWER, a citizen of the United States, and a resident of Brooklyn, county of Kings, city and State of New York, have invented new and useful Improvements in Stands for Moving-Picture Machines, of which the following is a specification.

This invention relates to stands for moving picture apparatus and has for its object to provide a stand which will permit adjustment of the picture machine in any direction and at any angle relatively to the supporting surface.
A further object of the invention is to provide a stand of this character in which the operation of a single locking member releases the parts for relative adjustment in any direction, which single part also serves to lock the parts of the stand together with absolute rigidity, after the adjustment is effected.

A further object of the invention is to provide a stand in which the adjustment may be effected with a micrometer accuracy with one hand whereby the operator may operate the machine and adjust it at the same time, to determine the best position of the picture on the screen.
A further object of the invention is to provide a stand for motion picture apparatus in which the weight of the projecting mechanism on one side of the axis of adjustment is balanced by the weight of the driving motor on the other side, thereby greatly reducing the effort necessary to adjust the machine, and making it adjustable with equal facility in either direction.

A further object of the invention is to provide a stand of simple construction and pleasing design which will offer a wide base and rigid support without undue weight in the stand.

Other objects of the invention will appear in the following specification wherein I have described a preferred design of my improved stand and one simple modification thereof, the same being illustrated in the accompanying drawings in which—
Fig. 1 is a side elevation of my improved stand, the legs thereof being partially broken away;

Fig. 2 is an end elevation from the right of Fig. 1;

Fig. 3 is a partial side elevation from the side opposite to that shown in Fig. 1;

Fig. 4 is a section on line 4—4 of Fig. 3;

Fig. 5 is a side elevation similar to Fig. 3 on a somewhat reduced scale of the modified form of the invention; and

Fig. 6 is a plan view of Fig. 5.

Referring to the drawing, particularly to Fig. 1, 1 indicates the base of the stand which comprises an upper plate 3 with outwardly and downwardly inclined webs 4 at each end, the corners of which are provided with sockets for the spreading legs 2. The legs 2 are preferably slidable within co-operating portions of the frame 1, as shown, so that an individual adjustment of each leg is possible. Projecting upwardly from the plate 3 is a cylindrical dome 5 having its outer curved surface machined to provide a bearing for the split collar 6 which supports the adjustable portion of the frame. Formed on the side of the collar 6 opposite the split is a boss 7 providing a horizontal bearing for a pin 8 on which the adjustable frame 9 is pivoted. On the split side of the collar which is to the rear, the collar is provided at both its upper and lower edges with bosses 10 and 11 respectively to provide bearings for the clamping bolts 12 and 13. The bolt 12 is set to hold the edges of the split collar against undue expansion but does not draw the edges together sufficiently for the collar to bind on the dome, the locking being effected entirely by the upper bolt 13.

The frame 9 comprises two side webs arranged one on each side of the collar 6 and held together in proper relation by suitable spacing bolts and webs as indicated at 14 and 15, the web 15 serving as a hanger for the electric motor 16, from which the mechanism is driven.

The frame 9 terminates at the side adjacent the bolt 8 in a flat vertical face to which is bolted the L-shaped bracket 18 and which supports the moving picture mechanism or machine head 19. Integral with the bracket 18 is the spider 20 to which is attached in the usual manner the magazine 21 for the film reel. The upper side of the rear portion of the frame 9 is provided with the usual guiderods 22 for supporting the projecting lantern not shown.

The frame 9 is freely pivoted on the pin 8 and each of the side webs is provided with an arcuate slot 17 having its center of curvature coincident with the center of the pin 8 through which the ends of the clamping bolt 13 project.

The end of the bolt 13 on the side of the machine as shown in Fig. 1 is provided with a simple nut or head which engages the flat face of the frame on either side of the slot 17. On the opposite side of the frame as shown in Fig. 3 the bolt projects beyond the face of the frame to a sufficient extent to provide an unthreaded portion beyond the frame which forms a bearing for a combined worm and spur gear 23 mounted for free rotation thereon. The spur teeth 25 of the gear 23 mesh with the teeth of an arcuate rack 24 attached to the face of the frame in parallelism with the slot 17. Engaging the worm teeth 26 of the gear is a worm 27 attached to a hand shaft 28 supported at its inner end by a yoke 29 on the bolt 13 and at its outer end by a suitable bearing 30 at the rear of the frame. The hand shaft 28 is provided with a suitable hand wheel 31 whereby it may be rotated to adjust the frame. The portion of the bolt 13 which projects beyond the yoke 29 is threaded as indicated in Fig. 4 and carries a clamping nut 32 having an integral handle whereby it may be turned by hand to clamp together the parts carried by the bolt.

The electro motor 16 is provided with a variable speed friction gear indicated at 35 through which the projecting mechanism is driven, the driving connection thereto being of the construction shown, comprising a longitudinal shaft 36 carried by the frame 9, and a driving belt 37 leading to the main driving pulley of the machine. If desired, however, the pulley of the machine may be belted directly to the driven part of the speed gear or to the motor shaft.

The operation of the mechanism to adjust the position of the picture will be obvious from the above description. By loosening the nut 32 the frame 9 is free for adjustment in both the vertical plane with the bolt 8 as an axis, and also in the horizontal plane around the dome 5. The horizontal adjustment is effected by taking hold of the frame and turning it to the desired angle. As the position of the center of gravity of the machine is not affected by the horizontal adjustment, the adjustment may be made directly with accuracy. For the vertical adjustment the operator uses a hand wheel 31 which, acting through its irreversible screw gearing, holds the machine in its adjustable position until the clamping nut can be turned to lock the machine. The weight of the machine is balanced as near as possible around the bolt 8 by properly locating the motor 16 on the rear part of the frame. An accurate balance cannot of course be had for the reason that the greatest weight is in the machine head 19 which swings outwardly as the front of the frame is lowered. The counterweight effect of the motor 16, however, reduces the unbalanced load to such an extent that the adjustment may be readily effected with little effort.

In Figs. 5 and 6 I have shown a somewhat modified arrangement of the adjusting screw for securing the vertical adjustment. As here shown, the screw shaft 40 is mounted in bearings on a supplemental frame-piece 41 which is supported on the two bolts 8 and 13 so as to be held against pivotal adjustment with the frame 9. The bearings in the shaft 40 are arranged at an angle to the longitudinal plane of the machine so that the hand wheel 42 projects away from the machine to be readily grasped by the operator. The worm 43 is cut at the proper angle to directly engage the worm wheel 26 which carries a spur gear 25 engaging the rack 24 in the same manner as in the preferred construction.

It will of course be understood that various other modifications of gearing may be employed for turning the frame 9 about its axis of adjustment.

I claim:

1. In a stand for moving picture projecting apparatus the combination of a base, an upper portion on which the projecting apparatus is mounted, connections between said base and said upper portion permitting relative adjustment in different planes, and means for locking the said parts together against movement in all said different planes comprising a single lock operating member effective at a single movement to lock said parts rigidly together, said connections comprising means for guiding said upper portion in two planes of movement at right angles to each other.

2. In a stand for moving picture projecting apparatus the combination of a base, an upper portion on which the projecting apparatus is mounted, connections between said base and said upper portion comprising an intermediate portion mounted for pivotal movement in one plane on said base and a pivotal connection between said intermediate portion and said upper portion permitting relative movement in another plane, and a single locking mechanism for simultaneously locking both pivotal connections to hold said upper portion rigidly against movement.

3. In a stand for moving picture projecting apparatus the combination of a base, an upper portion on which the projecting apparatus is mounted, connections between said base and said upper portion comprising an intermediate portion mounted for pivotal movement in one plane on said base, a pivotal connection between said intermediate portion and said upper portion permitting relative movement in another plane, a single locking mechanism for simultaneously locking both pivotal connections to hold said upper portion rigidly against movement, and means for effecting a micrometer adjustment of said pivotally connected parts in one plane of movement.

4. In a stand for moving picture projecting apparatus the combination of a base, a bearing carried by said base, a split member surrounding said bearing, a clamping member for contracting said split member on said bearing and an upper frame portion mounted on said clamping member and adapted to be locked against movement by said clamping member when the latter is operated to contract said split member.

5. In a stand for moving picture projecting apparatus, the combination of a base provided with a vertical spindle, a split collar surrounding said spindle, a bolt for contracting said collar on said spindle, an upper frame portion having bearings on said bolt intermediate the head and nut of said bolt and the adjacent portions of said collar whereby said bolt will lock said upper frame portion against movement when said collar is contracted on said spindle, and means for adjusting said upper frame part comprising a hand wheel and screw operating between said collar and upper frame part.

6. In a stand for moving picture projecting apparatus, the combination of a base, a bearing carried by said base, a member supported on said bearing, said member having a second bearing at right angles to said first mentioned bearing, an upper frame portion mounted on said second bearing, and adapted to support the projection mechanism, and a single lock for simultaneously locking the parts against movement at both said bearings.

7. In a stand for moving picture projecting apparatus, the combination of a base, separately adjustable legs supporting said base, a bearing carried by said base, a member supported on said bearing, said member having a second bearing at right angles to said first mentioned bearing, an upper frame portion mounted on said second bearing and adapted to support the projection mechanism, a single lock for simultaneously locking the parts against movement at both said bearings, and a screw mechanism for adjusting said parts on one of said bearings whereby when said lock is released the upper portion of the machine may be freely turned about the axis of the other bearing.

Signed at New York city in the county of New York and State of New York this 6th day of December, 1915.

NICHOLAS POWER.

Witnesses:
 EDWARD EARL,
 JACOB ORNSTEIN.